United States Patent
Yudina et al.

(12)

(10) Patent No.: US 11,854,710 B2
(45) Date of Patent: Dec. 26, 2023

(54) NUCLEAR REACTOR FUEL ASSEMBLY MANUFACTURING METHOD

(71) Applicant: PUBLICHNOE AKTSIONERNOE OBSHCHESTVO "NOVOSIBIRSKY ZAVOD KHIMKONTSENTRATOV" (PAO NZHK), Novosibirsk (RU)

(72) Inventors: Elena Vasilyevna Yudina, g. Novosibirsk (RU); Evgeny Gennadyevich Zelenkov, g. Novosibirsk (RU); Alexander Vladimirovich Strukov, g. Novosibirsk (RU); Sergei Anatolyevich Buimov, g. Novosibirsk (RU); Anatoly Savvich Tlusty, g. Novosibirsk (RU); Rasim Farmanogly Mustafaev, g. Novosibirsk (RU)

(73) Assignee: Publichnoe Aktsionernoe Obshchestvo "Novosibirsky Zabod Khimkontsentratov", Novosibirsk (RU)

( * ) Notice: Subject to any disclaimer, the term of this patent is extended or adjusted under 35 U.S.C. 154(b) by 5 days.

(21) Appl. No.: 17/256,591

(22) PCT Filed: Jul. 15, 2019

(86) PCT No.: PCT/RU2019/000502
§ 371 (c)(1),
(2) Date: Dec. 28, 2020

(87) PCT Pub. No.: WO2021/010852
PCT Pub. Date: Jan. 21, 2021

(65) Prior Publication Data
US 2022/0130559 A1 Apr. 28, 2022

(51) Int. Cl.
| | |
|---|---|
| *G21C 3/334* | (2006.01) |
| *G21C 3/20* | (2006.01) |
| *G21C 21/02* | (2006.01) |
| *G21C 3/07* | (2006.01) |

(52) U.S. Cl.
CPC .............. *G21C 3/334* (2013.01); *G21C 3/20* (2013.01); *G21C 21/02* (2013.01); *G21C 3/07* (2013.01)

(58) Field of Classification Search
CPC .......... G21C 3/20; G21C 21/02; G21C 3/334; G21C 3/07
USPC ......................... 376/261, 262, 415
See application file for complete search history.

(56) References Cited

U.S. PATENT DOCUMENTS

| | | | | |
|---|---|---|---|---|
| 3,757,403 A | * | 9/1973 | Bleiberg | G21C 3/334 376/442 |
| 5,028,382 A | * | 7/1991 | King | G21C 3/334 376/261 |
| 8,599,990 B2 | * | 12/2013 | Bausch | G21C 3/14 376/261 |
| 2009/0226729 A1 | * | 9/2009 | Niimoto | C09D 5/08 428/416 |
| 2022/0059245 A1 | * | 2/2022 | Osseforth | G21C 3/334 |

FOREIGN PATENT DOCUMENTS

| | | | |
|---|---|---|---|
| CN | 204043478 U | * | 12/2014 |
| FR | 3047420 A1 | * | 8/2017 |
| RU | 2140674 C1 | * | 10/1999 |
| RU | 2537951 C2 | * | 1/2015 |

* cited by examiner

*Primary Examiner* — Jack W Keith
*Assistant Examiner* — Daniel Wasil
(74) *Attorney, Agent, or Firm* — J. Miguel Hernandez; James R. Gourley; Carstens, Allen & Gourley, LLP

(57) ABSTRACT

A method for manufacturing nuclear reactor fuel assembly. The method comprises applying a protective coating on fuel elements, wherein each fuel element is moved through a protective coating application device installed on an assembly stand. The protective coating comprises a water-soluble lubricant consisting of nonylphenol ethoxylate and monobasic unsaturated fatty acids. The method further comprises installing the coated fuel elements into grid cells of an assembly, wherein during the installing, each coated fuel element is moved on the assembly stand in a horizontal direction along its own axis into the grid cells. At least part of the steps of applying a protective coating and installing the coated fuel elements occur simultaneously. After installing the coating, top and bottom nozzles are attached to the assembly. After attaching the top and bottom nozzles, the fuel elements are washed to remove the protective coating from the fuel elements, which are subsequently dried.

2 Claims, No Drawings

NUCLEAR REACTOR FUEL ASSEMBLY MANUFACTURING METHOD

CROSS-REFERENCE TO RELATED DISCLOSURE

This application is a U.S. National Stage of International Application No. PCT/RU2019/000502, filed on Jul. 15, 2019, titled "Nuclear Reactor Fuel Assembly Manufacturing Method." Each application, publication, and patent listed in this paragraph are hereby incorporated by reference in their entireties.

FIELD OF INVENTION

This invention is related to atomic energy industry and can be applied by enterprises manufacturing fuel assemblies, primarily for water-cooled and liquid metal-cooled nuclear power reactors.

PRIOR ART

It is known that fuel assembly manufacturing process includes an operation of installation of fuel elements prepared for assembly by pushing them through coaxial cells of grid, which grids are arranged parallel to each other and form a fuel assembly frame along with guide channels (see. B. A. Dementiev, Nuclear-power reactors. —Moscow, Energoatomizdat, 1990, p. 42-44)). Fuel element is the most critical and stressed structural component of nuclear power reactor core. Assurance of reliability and retention of fuel element sheath's tightness, and its secure retention in the frame during fuel assembly manufacturing ensures operational reliability and safety of fuel assembly and the whole reactor.

It is known that zirconium alloys from which fuel element sheath is made, tend to corrosion, primarily in surface damage areas—scratches, scores (see Zirconium metallurgy (translation from English), eds. G. A. Meerson and Yu. A. Gagarinsky—Moscow, "Inostrannaya Literatura" publishing house, 1959, p. 298)). In order to prevent fuel elements surface damage during their installation into fuel assembly frame, they are covered with protective film.

One of known methods of nuclear reactor fuel assembly manufacturing includes zirconium-covered fuel elements surface treatment according to which surface treatment of fuel elements with film formation is performed by immersion thereof vertically in hot solution of polyvinyl water-based lacquer with holding, subsequent coating with aqueous glycerin solution and film removal prior to fuel assembly packing with live steam in hot water (see patent RU 2265903, published on Dec. 10, 2005 Bulletin No. 34). Disadvantages of such method are: non-uniform thickness of lacquer coating layer applied along the length of fuel element surface due to vertical position of fuel element during holding leading to film thinning in the upper part of fuel elements and, therefore, to film protective properties degradation; high consumption and preparation complexity of polyvinyl water-based lacquer solution and, therefore, low handling ability, inability of manufacturing process optimization due to the need for large spaces to arrange lacquer application equipment, its high metal and energy consumption and low level of automation.

Nuclear reactor fuel assembly manufacturing method is known, implementation of which is characterized by the fact that preparation of fuel elements for installation into fuel assembly is performed by application of lacquer coating on the surface of fuel elements by bringing them in contact with lacquer in lacquer application device by moving them in horizontal direction along their own axis successively through lacquer application area and drying area of that device. Cylindrical surface of fuel element is moistened with lacquer in lacquer application area when it passes through tight-fitting elastic capillary-porous element to which lacquer is fed until its pores are filled with lacquer. Fuel elements movement is provided by rollers forming two supports located before lacquer application area and after drying area, respectively (see patent RU 2537951, published on Jan. 10, 2015. Bulletin No. 1). Disadvantages of this method are: non-uniform thickness of lacquer coating layer not only along the length but in each fuel element section leading to its blistering and peeling during drying and, as consequence, to surface stripping leading to appearance of coarse tears and pilling-ups during assembly; necessity of having a multicomponent plant with significant overall dimensions equipped with complex automation package; duration of fuel element surface preparation for assembly which is linked, in particular, with assurance of complete drying—polymerization of dry film coating.

The closest method in terms of its technical substance and result to be achieved is the method of fuel bundles manufacturing (see patent RU 2140674, published on Oct. 27, 1999 Bulletin No. 30)—prototype including fuel elements fabrication and control operations, application and drying of lacquer coating on each fuel element prior to fuel elements installation into fuel assembly, installation of fuel elements into fuel assembly on assembly stand, attachment of top and bottom nozzles, washing off protective coating and drying. Disadvantage of this method is the lack of manufacturing process efficiency due to the necessity of application of lacquer mixture in the form of solution of distilled water with polyvinyl alcohol as fuel elements' protective coating: such coating application technology requires bulky hardware as specified in analogs; film drying is required after coating application which also requires time and labor expenditures. Quality of applied coating is also unsatisfactory due to difficulties in its application and drying in uniform layer which is necessary to ensure the absence of coarse tears, pilling-ups, etc. during subsequent fuel assembly installation. Lacquer coating discontinuities are not excluded. They can lead to tears of more than 30 μm representing a reason for fuel element replacement or pilling-ups which shall be removed manually using special fixtures.

SUMMARY OF THE INVENTION

Technical task of proposed invention is to ensure nuclear reactor fuel assembly manufacturing quality and, at the same time, to ensure manufacturing process efficiency and related decrease of fuel assemblies manufacturing cost.

The method of nuclear reactor fuel assembly manufacture intended to solve this task includes fuel elements fabrication and control operations, application and drying of lacquer coating on each fuel element, installation of prepared fuel elements into fuel assembly on assembly stand, attachment of top and bottom nozzles, washing off protective coating and drying. According to the invention, operations of protective coating application and fuel elements installation into fuel assembly on assembly stand are combined: each fuel element being moved during fuel elements installation operation on assembly stand in horizontal direction along its own axis to the cells of grids forming fuel assembly frame passes through protective coating application device installed on the assembly stand. Water soluble lubricant consisting of nonylphenol ethoxylate in the amount of 20% to 45% and monobasic unsaturated fatty acids in the quantity of 80% to 55% is used as protective coating.

The task is also solved through the fact that protective layer is washed off using water jets under pressure at room temperature.

Implementation of proposed nuclear reactor fuel assembly manufacturing method allows performing the task consisting in fuel assembly manufacturing with required quality level ensuring safe fuel assembly operation in nuclear reactor with simultaneous increase of manufacturing process efficiency and decrease of manufacturing cost.

Water soluble lubricant of proposed composition used as protective coating can be distributed throughout the surface of fuel element forming a thin uniform layer by means of single wrapping of fuel element perimeter with lubricant-saturated material, and does not need drying which allows lubricant application on the surface of fuel elements moving continuously for manufacturing fuel assemblies directly on the assembly stand while obtaining high-quality protective coating of the surface of fuel element. Absence of tendency to running-off and formation of non-uniform coating is ensured by the additive in the lubricant composition in the form of nonylphenol ethoxylate which, when mixed with monobasic fatty acids, allows uniform mixture distribution throughout the length of the sheath. Presence of additive provides necessary lubricant viscosity and increases lubricant adhesion to alloys including zirconium alloys thanks to which, in the course of fuel elements installation into fuel assembly on assembly stand, when fuel elements touch pin fasteners of grids, water soluble lubricant of chosen composition is not displaced from contacting joints between the grid's pin fasteners and fuel elements, therefore, the risk of scratch marks, tears and pilling-ups formation on fuel elements surface is excluded. Therefore, the use of lubricant of proposed composition contributes to the increase of manufacturing process efficiency: operations which were earlier unavoidable in the fuel assemblies manufacturing process prior to fuel elements installation into fuel assembly on assembly stand are now excluded, namely: inter-operation cassette disassembly, attachment of fuel elements on lengthy lacquer application unit, preliminary washing off for 15 to 20 minutes, immersion in solution prepared from single grades of polyvinyl water-based lacquer, drying of fuel elements at the temperature of 70 to 90° C. for 12 to 15 minutes and subsequent assembly in inter-operation cassette; fuel elements installation into fuel assembly on assembly stand can be combined with protective coating application.

Presence of fatty acids in the lubricant composition contributes to both coating application quality and complete removal thereof. Therefore, the goal of fuel assembly manufacturing process optimization and decrease of its cost without prejudice to quality is achieved.

THE BEST EMBODIMENT OF THE INVENTION

The method of nuclear reactor fuel assembly manufacturing is implemented as follows.

Fuel elements in the form of long tubes made primarily of zirconium alloy, sealed at both ends, pre-charged with fuel pellets and having passed all inspection operations are collected in a bundle—a set of fuel elements intended for assembling in one cassette (fuel assembly), packed in inter-operation cassette and then transported to FAs assembly stand.

Installation of fuel elements into fuel assembly on assembly stand is performed by pushing fuel elements moved by pushing mechanism in horizontal direction along their own axis through protective coating application device and grid cells into fuel assembly frame. Protective coating application device may be, for example, a drawing die with inner surface lined with porous elastic material saturated with water soluble lubricant of proposed composition which may be installed on the assembly stand immediately before the first grid located in the frame in the direction of fuel element movement, or similarly located container filled with lubricant of proposed composition and provided with coaxial opening for fuel element passing through.

After installation of all fuel elements forming a single fuel assembly, top and bottom nozzles are attached to the fuel assembly.

Then water soluble lubricant is washed off from the fuel assembly with water jets under pressure at room temperature on jet washing unit. Washing off is also possible on jet washing unit with subsequent cassette placement in a retort with water at room temperature and bubbling during 30 minutes with subsequent water drainage. Washing off is repeated twice with the last washing off performed using hot water having the temperature of 80 to 90° C.

Fuel assemblies are dried at the temperature of 100 to 120° C. for 40 minutes.

INDUSTRIAL APPLICABILITY

Proposed method of nuclear reactor fuel assemblies manufacture using water soluble lubricant of proposed composition as protective layer instead of lacquer application has passed type tests in production environment.

Dummy fuel assemblies moved on assembly stand through protective coating application device were pushed through the grids of TVS-2M frame consisting of the grids attached on guide channels and central tube. Pushing force along the frame length was recorded. Statistical characteristics of the pushing force applied to dummy fuel assemblies when performing type tests of TVS-2M assembly using a lubricant were as follows:

average value—244.7 N;
standard deviation from average value—47.9 N;
minimum value—68.6 N;
maximum value—358.5 N.

Lubricant containing 30% of nonylphenol ethoxylate and 70% of monobasic fatty acids mixture was used.

Lubricant coating application quality was controlled in the course of assembly. Results of control have proven lubricant viscosity values necessary and sufficient for retention thereof on fuel element surface and its integrity during contact with spring elements of grid, which allows single application of lubricant on fuel element surface. Inspection of fuel elements having passed assembly operation has shown that maximum scratch marks depth measured using cast method was 9 to 13 μm. Most of scratch marks have a depth of 5 to 8 μm which does not exceed allowable values in respect of mechanical damages (30 μm) and potential risk of corrosion. Pilling-ups and tears were not observed.

Lubricant ability to cover fuel element surface with a thin layer ensures its minimum consumption in manufacturing process: 1.0 to 1.51 for assembling one fuel assembly.

Operation of fuel elements installation into fuel assembly using a lubricant of proposed composition does not require any design changes of existing assembly stands. Assembly is performed on standard equipment.

Therefore, implementation of proposed nuclear reactor fuel assembly manufacturing method allows solving the allotted task: ensure fuel assembly manufacturing quality and, at the same time, ensure manufacturing process efficiency and related decrease of fuel assemblies manufacturing cost. This method offers an opportunity for creation of continuous cycle of fuel elements fabrication and installation thereof into fuel assemblies.

What is claimed is:

1. A method for manufacturing nuclear reactor fuel assembly, the method comprising the steps:
   (a) applying a protective coating on fuel elements, wherein during the applying, each fuel element is moved through a protective coating application device installed on an assembly stand, and wherein the protective coating comprises a water-soluble lubricant consisting of nonylphenol ethoxylate and monobasic unsaturated fatty acids;
   (b) installing the coated fuel elements into grid cells of an assembly, wherein during the installing, each coated fuel element is moved on the assembly stand in a horizontal direction along its own axis into the grid cells;
   (c) subsequent to (b), attaching top and bottom nozzles to the assembly;
   (d) subsequent to (c), washing the fuel elements to remove the protective coating from the fuel elements; and
   (e) subsequent to (d), drying the fuel elements;
   wherein at least part of steps (a) and (b) occur simultaneously.

2. The method according to claim 1, wherein during the step (d), the protective layer is removed by using water jets under pressure at room temperature.

* * * * *